June 29, 1965 H. J. BIESCHKE 3,191,663
PROJECTION SCREEN
Filed July 26, 1962 3 Sheets-Sheet 1
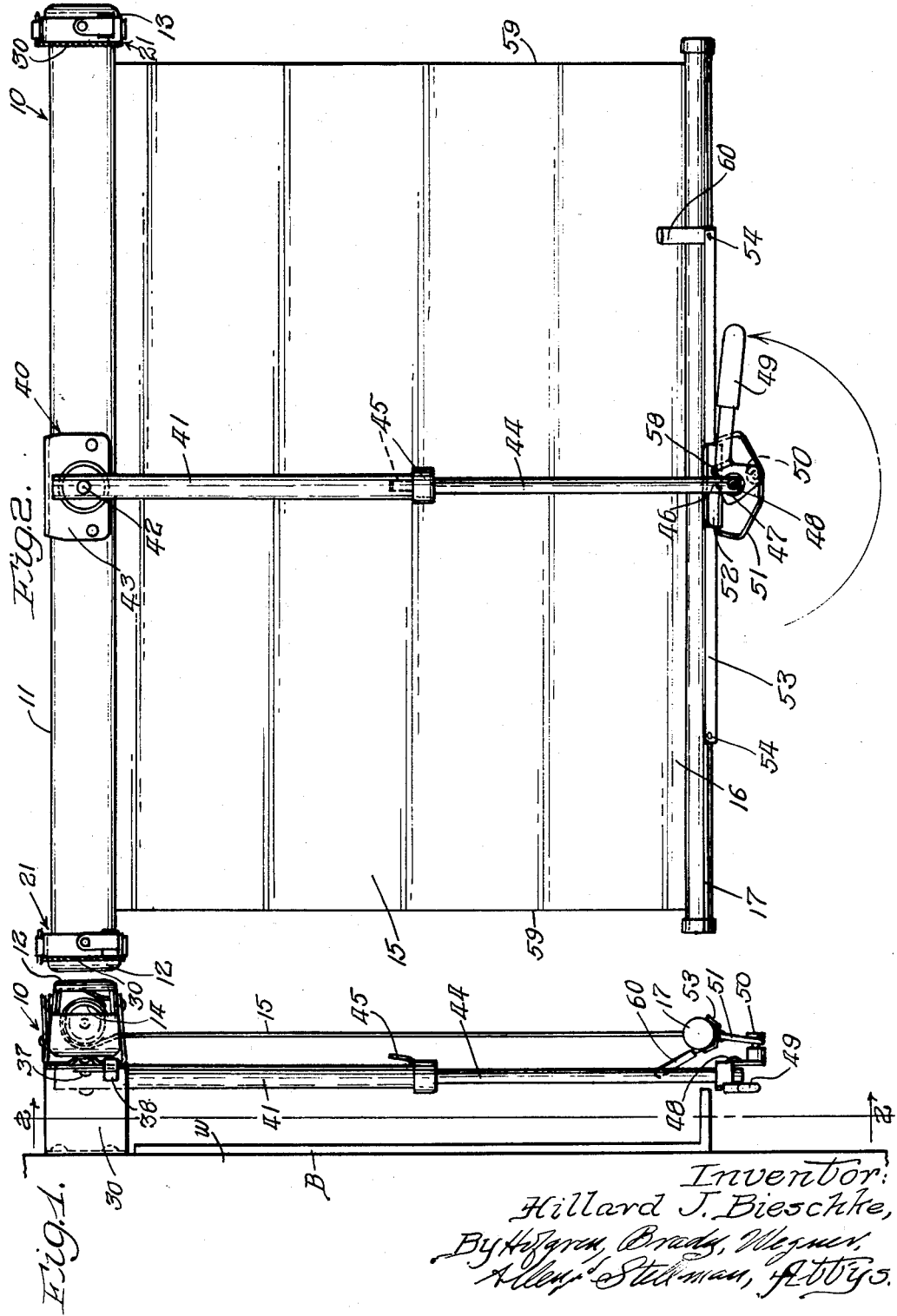
Inventor:
Hillard J. Bieschke, June 29, 1965  H. J. BIESCHKE  3,191,663
PROJECTION SCREEN
Filed July 26, 1962  3 Sheets-Sheet 2
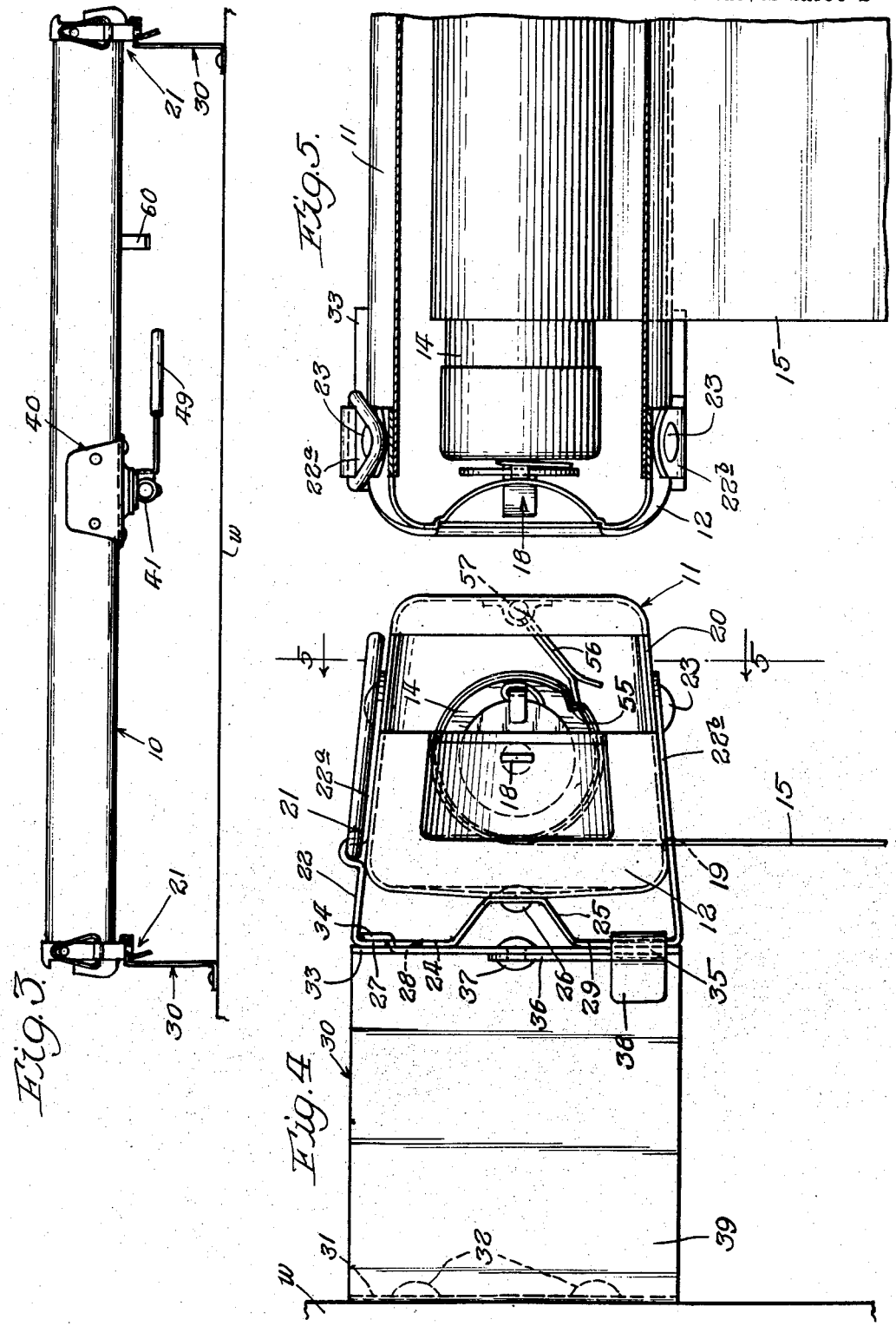

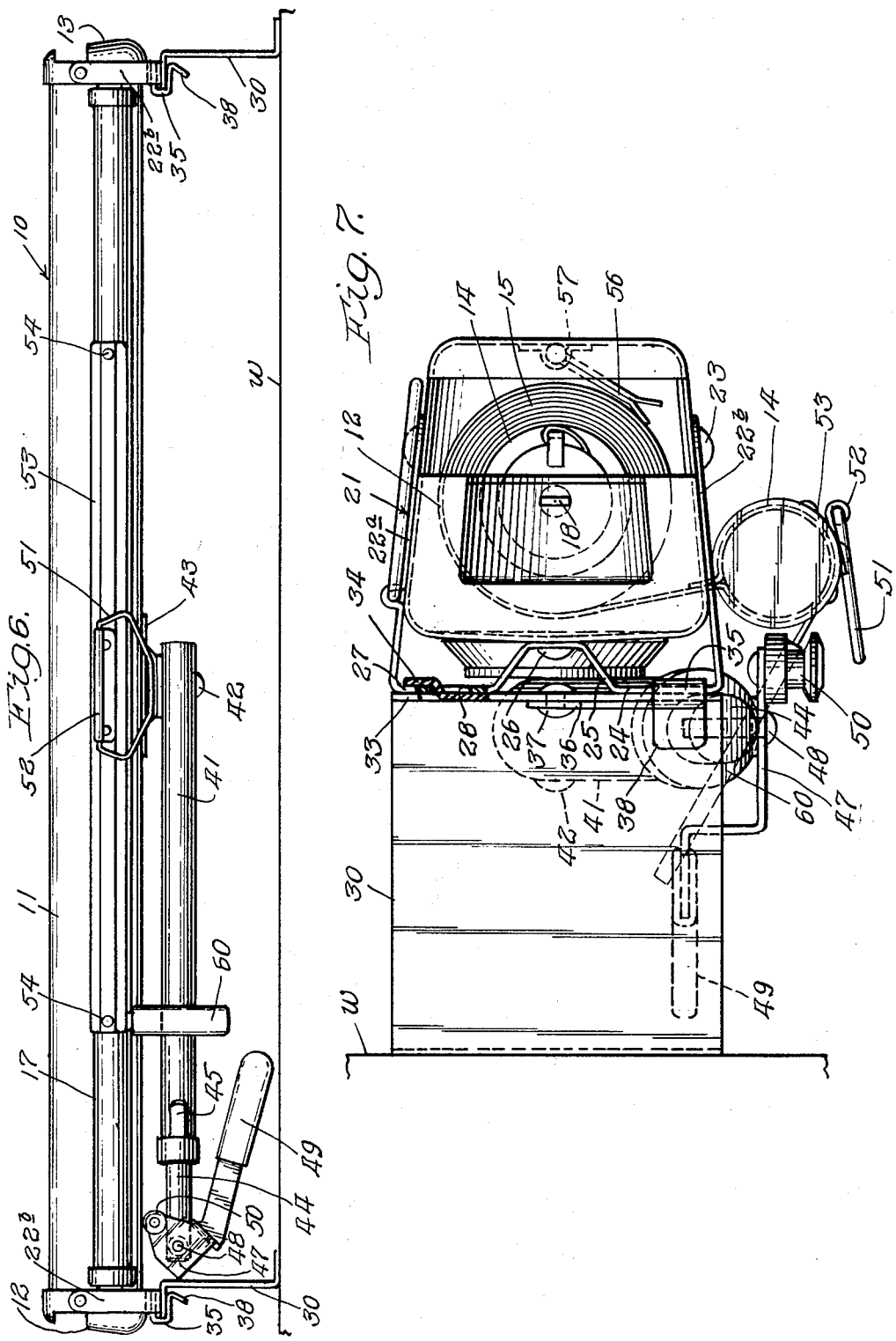

United States Patent Office 3,191,663
Patented June 29, 1965

3,191,663
PROJECTION SCREEN
Hillard J. Bieschke, Schiller Park, Ill., assignor to Knox Manufacturing Company, a corporation of Illinois
Filed July 26, 1962, Ser. No. 212,672
6 Claims. (Cl. 160—24)

This invention relates to projection screens, and in particular, to projection screens arranged for wall mounting.

Picture projection screens adapted to be supported upon floor standards of the tripod type have commonly been provided with stretcher means for holding the screen fabric in a tautly extended position whereby the screen may be disposed accurately flatly in a vertical plane. However, wall mounted screen apparatus have not been entirely satisfactory in providing such a taut viewing screen surface. The present invention comprehends such a wall mounted screen apparatus including improved means for mounting the screen and for retaining the screen in the desired taut condition for viewing.

Thus, a principal feature of the present invention is the provision of a new and improved picture screen apparatus.

Another feature of the invention is the provision of such a screen apparatus having improved bracket means for mounting the apparatus on a wall, such as adjacent a school blackboard.

A further feature of the invention is the provision of such a screen apparatus having new and improved means for holding the screen tautly in an extended viewing position.

Still another feature of the invention is the provision of such picture screen apparatus including means associated with the screen for releasably retaining the holding means or supporting standard in a retracted position adjacent the screen casing of the apparatus.

A yet further feature of the invention is the provision of such a picture screen apparatus wherein the supporting standard or means for holding the screen taut is biased to an extended position, and the apparatus is arranged to have the holding means move automatically to the extended position when the screen is withdrawn from the casing to open viewing position.

Other features and advantages of the invention will be apparent from the following description taken in connection with the accompanying drawings wherein:

FIGURE 1 is a side elevation of a picture screen apparatus embodying the invention mounted on a wall adjacent a conventional blackboard thereon;

FIGURE 2 is a rear elevation thereof taken substantially along the line 2—2 of FIGURE 1;

FIGURE 3 is a top plan view thereof;

FIGURE 4 is an enlarged fragmentary side elevation illustrating the bracket means in greater detail;

FIGURE 5 is a fragmentary vertical section taken substantially along the line 5—5 of FIGURE 4;

FIGURE 6 is a bottom view of the picture screen apparatus in a retracted position; and FIGURE 7 is a side elevation of the picture screen apparatus in the retracted position.

In the exemplary embodiment of the invention as disclosed in the drawing, a picture screen apparatus generally designated 10 is shown to comprise a casing 11 having a pair of end caps 12 and 13 carrying therebetween a roller 14 to which is secured a picture screen 15. The screen 15 is secured to the roller 14 in the conventional manner, being wrapped around the roller, as best seen in FIGURES 1 and 4, and having an outer or free end portion 16 provided with a reinforcing rod 17. Roller 14 is provided with a conventional spring biased device 18 normally urging the screen into a retracted arrangement or closed position wrapped around the roller within the casing 11. The screen may be pulled against the bias of device 18 through an elongated opening 19 in the bottom wall 20 of the casing 11 to an extended viewing arrangement or position, as shown in FIGURES 1 and 2.

The above described structure of picture screen apparatus 10 is substantially conventional. The present invention comprehends an improved bracket structure generally designated 21 associated therewith for supporting the apparatus on a wall W. The bracket structure 21 is arranged to dispose the apparatus 10 forwardly of the wall sufficiently to clear structure thereon, such as a conventional schoolroom blackboard and the chalk tray associated therewith.

More specifically, the bracket structure 21 includes a first U-shaped bracket 22 having leg portions 22a and 22b secured to the casing 11 by suitable means such as screws 23. The bracket 22 straddles the casing, as best seen in FIGURE 4, and the bight portion 24 thereof is provided with an inturned middle section 25 which is secured to the casing 11 by suitable means such as screws 26. The upper portion 27 of bight 24 extending between middle section 25 and leg 22a is provided with a keyhole slot 28. A bight portion 29 extends between middle section 25 and lower leg 22b.

Each bracket structure 21 further includes a wall bracket 30 having a rear flange 31 adapted to be secured in facial engagement with the wall W by suitable means such as screws 32. The forward end of the bracket defines a turned flange 33 having a hook 34 formed therefrom to extend through slot 28 and retain the upper portion of the flange 33 in facial engagement with the bight portion 27 of bracket 22. The lower portion of the flange 33 is releasably retained in facial engagement with the lower bight portion 29 by means of a clip 35 carried on an arm 36 pivotally secured to the mid-portion of the flange 33 by suitable means such as rivet 37. A thumb piece 38 is formed at the end of arm 36 for manipulating the arm to cause the clip 35 to straddle the lower end of the flange 33 and the bight portion 29 of bracket 22 in a locking position, as shown in FIGURE 4. Thus, slot 28 effectively defines a downwardly facing shoulder on bracket 22, and leg 22b effectively defines an upwardly facing shoulder thereon. Hook 34 effectively defines an upwardly facing shoulder selectively engageable with the downwardly facing shoulder defined by slot 28 and the clip 35 effectively defines a downwardly facing shoulder confronting leg 22b. This arrangement of the shoulder defining means effectively locks the brackets in association when arranged as shown in FIGURE 4 to prevent accidental disengagement of the screen casing from the wall brackets.

Should it be desired to remove the screen, however, from the bracket 30 this can be simply effected by pivoting the clip away from its straddling association with bight portion 29 of bracket 22, and raising the casing to move the slot 28 upwardly until hook 34 is aligned with the slot, thereby permitting a forward movement of the casing whereby the bracket 22 is disassociated from the bracket 30. Mounting of bracket 22 on bracket 30 is effected by a simple reversing procedure wherein the bracket 22 is first hooked onto hook 34 by suitable passage of the hook through the slot 28 and subsequent slight downward movement of the bracket to the position of FIGURE 4. The arm 36 is then pivoted by suitable movement of thumb piece 38 to cause clip 35 to straddle the flange 33 and bight portion 29.

The middle portion 39 of bracket 30 is preferably relatively long so as to space the casing 11 sufficiently from wall W to assure clearance of the picture screen apparatus with blackboard B, as best seen in FIGURE 1. As shown, the brackets 30 may be installed directly above the blackboard so as to permit a disposition of the screen 15 directly in front of the blackboard at the normal viewing elevation.

As indicated briefly above, the invention further comprehends means for retaining the screen 15 in a taut extended arrangement, as shown in FIGURES 1 and 2. This means herein comprises an adjustable standard 40 having a first tubular portion 41 pivotally connected by a pivot means 42 to a bracket 43 carried on the mid-portion of the casing 11. Telescopically receivable within tubular portion 41 is a connecting portion or rod 44 which is arranged to slide freely to an extended arrangement, as shown in FIGURES 1 and 2. A locking device 45, herein comprising a conventional Swedish clamp, is provided on the tubular portion 41 permitting such free sliding movement of rod 44 to the extended arrangement, but requiring suitable release or manipulation to permit retraction of the rod 44 back into tubular member 41.

The distal or free end 46 of rod 44 carries a screen stretching member 47 pivotally mounted thereon by means of a pivot 48 and having connected thereto an operating handle 49. The stretching member is provided with an annularly grooved post 50 which is slidably engageable with a bail 51 secured to the screen rod 17 by a bracket 52 carried on a spring member 53 secured to the rod 17 at its opposite ends by suitable means such as screws 54.

The roller 14 is adapted to be stopped automatically after a predetermined number of convolutions of screen material are unwound therefrom in pulling the screen material to open position. The roller 14 is provided with a recess 55 adjacent one end thereof which is adapted to receive a spring stop 56 carried on the housing 11 by a suitable bracket 57. The spring stop is biased to bear against the screen wrapped around the roller, and when the screen is withdrawn a predetermined number of convolutions from the roller, it moves into the recess in the roller 55 thereby automatically limiting the withdrawal rotation of the roller 14.

Post 50 is positioned off center of the pivot 48 on stretching member 47 so as to force bail 51 downwardly slightly beyond its normal position when the screen is manually withdrawn from the casing. The spring mounting of the bail on member 53 allows sufficient yielding to permit the post to be swung to the position of FIGURE 2 slightly beyond the center, or maximum downward, position of the post. The stretching member 47 is prevented from moving beyond this over-centered position by a stop 58 which abuts the distal end 46 of the rod 44, as shown in FIGURE 2. Thus, the screen 15 is tautly retained in the extended arrangement of FIGURE 2, assuring the accurate disposition of the screen flatly in an upright plane parallel to wall W. As the connection of the spring member 53 to the rod 17 is adjacent the opposite ends of the rod 17, the vertical edges 59 of the screen are maintained taut, thereby assuring the desired planar arrangement of the screen.

Referring now to FIGURE 6, a further feature of the invention is illustrated. More specifically, the screen reinforcing rod 17 is further provided with an arm 60 which extends perpendicular thereto and rearwardly from the flat plane of the screen, as shown in FIGURE 1. Thus, in returning the picture screen apparatus to the retracted arrangement, wherein the screen 15 is disposed substantially fully within the casing 11, the arm 60 serves as a means for retaining the supporting standard 40 in a retracted position adjacent the casing. Thus, as illustrated, the arm 60 extends under the tubular portion 41 of the standard 40 when it is pivoted to a substantially horizontal position and holds the arm against the gravitational bias thereof in the retracted position. The spring means 18 biasing the roller to the retracted position is made sufficiently strong to offset the tendency of the standard to pivot to the extended arrangement of FIGURE 2.

In the illustrated embodiment, standard 40 is freely pivotable on pivot 42 so that it will swing automatically to the extended arrangement of pivot 42 when the screen is withdrawn to its extended arrangement. Further, the locking means 45 is disclosed as comprising a Swedish clamp herein. Obviously, other suitable locking means may be employed. The illustrated Swedish clamp, however, provides the highly desirable features of permitting locking of the rod 44 at any desired amount of extension from member 41. Further, the Swedish clamp 45 may be arranged to maintain the rod 44 in a single position of rotation about its longitudinal axis, thereby assuring a forward extension of the post 50 when the standard is arranged in the extended arrangement of FIGURE 2.

It is believed that the operation of picture screen 10 is obvious from the above description of the structure. Briefly, however, the apparatus is readily mounted on bracket 30 by engagement of hooks 34 with the brackets 22 in slots 28 thereof. The brackets 22 are locked in association with brackets 30 by a downward pivoting of the arm 36 to engage the clips 35 with the bight portion 29 of the bracket 22. The screen 15 is then withdrawn from the casing 11 by a simple downward urging of bail 51 whereupon, in the illustrated embodiment, the standard 40 automatically pivots downwardly from the retracted position of FIGURE 6 to the extended arrangement of FIGURES 1 and 2. The post 50 is then engaged with the bail 51 and arm 49 is manipulated to swing the stretching member 47 to a slightly overcentered position, as shown in FIGURE 2, thereby holding the screen in a taut condition.

To restore the apparatus to the retracted arrangement, the operator merely reversely pivots arm 49 and removes the post 50 from engagement with bail 51. Swedish clamp 45 is then operated to permit a retraction of rod 44 to fully within tubular member 41, and the standard is pivoted to the retracted position of FIGURE 6. The spring means 18 is permitted to draw the screen back into casing 11 about the roller 14 until the rod 17 abuts the casing 11 adjacent opening 19. At this time, arm 60 underlies the standard 40 and automatically retains the standard in the retracted position. If it is desired to remove the apparatus from brackets 30, the clips 35 are removed from engagement with bight portions 29 of bracket 22 by suitable release or manipulation of thumb piece 38 to pivot the arms 36 suitably, and the apparatus is elevated sufficiently to unhook the bracket portions 27 from the hooks of bracket 30, whereupon the apparatus may be removed from association with bracket 30, as desired.

While I have shown and described one embodiment of my invention, it is to be understood that it is capable of many modifications. Changes, therefore, in the construction and arrangement may be made without departing from the spirit and scope of the invention as defined in the appended claims.

I claim:
1. In a wall-mounted picture screen apparatus including a casing and a picture screen having an inner portion secured to said casing, said screen being selectively extendible from the casing and having an outer portion, apparatus for tautly retaining the screen in an extended arrangement comprising: a telescoping supporting standard pivoted to the casing and having a connecting portion, said standard being biased toward said screen-holding arrangement; means for selectively locking said standard in a screen-holding arrangement wherein said connecting portion is spaced from said casing a distance substantially similar to the distance that said outer portion of the screen is spaced from the casing when the screen is in said extended arrangement; means on the standard selectively engaging said outer portion of the screen for holding the screen tautly in said extended arrangement; and means on the screen for releasably holding the standard against the bias thereof when the screen is in a retracted position substantially fully within the casing.

2. In a wall-mounted picture screen apparatus including a casing and a picture screen having an inner portion secured to said casing, said screen being selectively extendible from the casing and having an outer portion, apparatus for tautly retaining the screen in an extended arrangement comprising: a telescoping extensible supporting standard pivoted to the casing and having a connecting portion movable relative to said standard to different positions of extended adjustment, said standard being biased toward said screen-holding arrangement; means for selectively locking said standard in a screen-holding arrangement wherein said connecting portion is spaced from said casing a distance substantially similar to the distance that said outer portion of the screen is spaced from the casing when the screen is in said extended arrangement; means on the standard selectively engaging said outer portion of the screen for holding the screen tautly in said extended arrangement; means for biasing the screen toward said retracted position, the biasing force of said screen biasing means being greater than the biasing force of the standard biasing means; and means on the screen for releasably holding the standard against the bias thereof when the screen is in a retracted position substantially fully within the casing.

3. In a wall-mounted picture screen apparatus including a casing and a picture screen having an inner portion secured to said casing, said screen being selectively extendible from the casing and having an outer portion, apparatus for tautly retaining the screen in an extended arrangement comprising: a telescoping extensible standard permanently pivotally carried on the casing and having a distal connecting portion; means for selectively locking said standard against retraction in different extended, screen-holding positions wherein said connecting portion is spaced from said casing a distance substantially similar to the distance that said outer portion of the screen is spaced from the casing when the screen is in said extended arrangement, said locking means yieldable responsive to extension of the standard when the standard is pivoted to a vertically depending position; means on the standard engaging said outer portion of the screen for holding the screen tautly in said extended arrangement; and means on the screen for selectively holding the standard in a pivotally retracted position adjacent the casing when the screen is in a retracted arrangement substantially fully within the casing.

4. In a wall-mounted picture screen apparatus including a casing and a picture screen having an inner portion secured to said casing, said screen being selectively extendible from the casing and having an outer portion, apparatus for tautly retaining the screen in an extended arrangement comprising: means for securing said screen casing to a substantially planar surface; a telescoping supporting standard pivoted to the casing and having a connecting portion, said standard being biased toward said screen-holding arrangement; means for selectively locking said standard in a screen holding arrangement wherein said connecting portion is spaced from said casing a distance substantially similar to the distance that said outer portion of the screen is spaced from the casing when the screen is in said extended arrangement; stretching means on the standard selectively engaging said outer portion of the screen for stretching the screen tautly in said extended arrangement to provide a smooth planar surface; and means for releasably holding the standard against pivoting relative to the casing when the screen is in a retracted position substantially fully within the casing.

5. In a wall-mounted picture screen apparatus including a casing and a picture screen having an inner portion secured to said casing, said screen being selectively extendible from the casing and having an outer portion, apparatus for tautly retaining the screen in an extended arrangement comprising: means for securing said screen casing to a substantially planar surface; a telescoping extensible supporting standard pivoted to the casing and having a connecting portion movable relative to said standard to different positions of extended adjustment said standard being biased toward said screen-holding arrangement; means for selectively locking said standard in a screen-holding arrangement wherein said connecting portion is spaced from said casing a distance substantially similar to the distance that said outer portion of the screen is spaced from the casing when the screen is in said extended arrangement; stretching means on the standard selectively engaging said outer portion of the screen for stretching the screen tautly in said extended arrangement; means for biasing the screen toward said retracted position, the biasing force of said screen biasing means being greater than the biasing force of the standard biasing means; and means for releasably holding the standard against the bias thereof from pivoting relative to the casing.

6. In a wall-mounted picture screen apparatus including a casing and a picture screen having an inner portion secured to said casing, said screen being selectively extendible from the casing and having an outer portion, apparatus for tautly retaining the screen in an extended arrangement, comprising: means for securing said screen casing to a substantially planar surface; a telescoping extensible standard pivotally carried on the casing and having a distal connecting portion; means for selectively locking said standard against retraction in different extended, screen-holding positions wherein said connecting portion is spaced from said casing a distance substantially similar to the distance that said outer portion of the screen is spaced from the casing when the screen is in said extended arrangement; said locking means yieldably responsive to extension of the standard when the standard is pivoted to a vertically depending position; stretching means on the standard engaging said outer portion of the screen for stretching the screen tautly in said extended arrangement; and means on the screen for selectively holding the standard in a pivotally retracted position adjacent the casing when the screen is in a retracted arrangement substantially fully within the casing.

UNITED STATES PATENTS

| | | | |
|---|---|---|---|
| 2,293,662 | 8/42 | Richardson | 160—19 |
| 2,534,960 | 12/50 | Ditty | 160—24 |
| 2,579,850 | 12/51 | Nimkoff | 160—24 |
| 2,706,521 | 4/55 | Nelson | 160—3 |
| 2,793,687 | 5/57 | Petrick | 160—24 |
| 2,902,240 | 9/59 | La Belle | 248—201 |
| 3,036,629 | 5/62 | Nicholas | 160—24 |
| 3,037,730 | 6/62 | Knoll et al. | 248—201 |

FOREIGN PATENTS 444,278    5/27    Germany.

HARRISON R. MOSELEY, *Primary Examiner.*